(12) United States Patent
Rice

(10) Patent No.: US 9,976,514 B2
(45) Date of Patent: May 22, 2018

(54) PROPULSIVE FORCE VECTORING

(71) Applicant: Rolls Royce North American Technologies Inc., Indianapolis, IN (US)

(72) Inventor: Edward C. Rice, Indianapolis, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 99 days.

(21) Appl. No.: 14/837,557

(22) Filed: Aug. 27, 2015

(65) Prior Publication Data

US 2017/0058826 A1    Mar. 2, 2017

(51) Int. Cl.
*F02K 1/00* (2006.01)
*B64C 23/08* (2006.01)

(52) U.S. Cl.
CPC .............. *F02K 1/008* (2013.01); *B64C 23/08* (2013.01); *F02K 1/002* (2013.01); *F05D 2220/90* (2013.01); *F05D 2250/411* (2013.01)

(58) Field of Classification Search
CPC .......... F02K 1/002; F02K 1/004; F02K 1/006; F02K 1/008; F02K 9/80; F02K 9/805; F02K 9/84; F02K 9/90; B64C 23/08
See application file for complete search history.

(56) References Cited

U.S. PATENT DOCUMENTS

| | | | |
|---|---|---|---|
| 3,180,087 A * | 4/1965 | Marchant | B64C 9/38 244/52 |
| 3,442,493 A | 5/1969 | Smith, Jr. | |
| 3,739,580 A | 6/1973 | Bland et al. | |
| 3,861,822 A | 1/1975 | Wanger | |
| 3,946,554 A | 3/1976 | Neumann | |
| 4,000,868 A | 1/1977 | Gregor | |
| 4,089,493 A | 5/1978 | Paulson | |
| 4,235,397 A | 11/1980 | Compton | |
| 4,254,619 A | 3/1981 | Giffin, III et al. | |
| 4,705,452 A | 11/1987 | Karadimas | |
| 4,791,783 A | 12/1988 | Neitzel | |
| 4,948,072 A * | 8/1990 | Garland | F02K 1/002 239/265.25 |
| 5,180,119 A | 1/1993 | Picard | |
| 5,314,301 A | 5/1994 | Knight | |
| 5,464,175 A | 11/1995 | Short | |
| 5,472,314 A | 12/1995 | Delonge et al. | |
| 5,518,363 A | 5/1996 | Theis | |
| 5,520,511 A | 5/1996 | Loudet et al. | |
| 5,855,340 A | 1/1999 | Bacon | |
| 5,911,679 A | 6/1999 | Farrell et al. | |
| 5,947,412 A | 9/1999 | Berman | |
| 6,318,668 B1 * | 11/2001 | Ulanoski | B64C 29/0058 239/265.19 |
| 6,379,110 B1 | 4/2002 | McCormick et al. | |
| 6,845,606 B2 | 1/2005 | Franchet et al. | |
| 7,033,132 B2 | 4/2006 | Gharib | |
| 7,059,129 B2 | 6/2006 | Zollinger et al. | |

(Continued)

*Primary Examiner* — Andrew Nguyen

(74) *Attorney, Agent, or Firm* — Duane Morris LLP

(57) ABSTRACT

A propulsive force imparted to an object is vectored using rotatable members arranged in one or more arrays disposed in the path of a fluid ejected by a fluid accelerator unit, such as air ejected by a fan driven by a gas turbine engine. The propulsive force is vectored by changing the rotation of one or more of the rotatable members.

5 Claims, 11 Drawing Sheets

(56) References Cited

U.S. PATENT DOCUMENTS

| | | |
|---|---|---|
| 7,114,911 B2 | 10/2006 | Martin et al. |
| 7,134,631 B2 | 11/2006 | Loth |
| 7,140,188 B2 | 11/2006 | Hosokawa et al. |
| 7,444,802 B2 | 11/2008 | Parry |
| 7,464,533 B2 | 12/2008 | Wollenweber |
| 7,491,030 B1 | 2/2009 | Pinera et al. |
| 7,549,839 B2 | 6/2009 | Carroll et al. |
| 7,631,483 B2 | 12/2009 | Mani et al. |
| 7,665,689 B2 | 2/2010 | McComb |
| 7,669,404 B2 | 3/2010 | Samimy et al. |
| 7,828,516 B2 | 11/2010 | Hartmann et al. |
| 7,837,436 B2 | 11/2010 | Corsmeier et al. |
| 7,877,980 B2 | 2/2011 | Johnson |
| 7,887,287 B2 | 2/2011 | Yanagi et al. |
| 8,011,882 B2 | 9/2011 | McMillan |
| 8,152,095 B2 | 4/2012 | Cazals et al. |
| 8,161,728 B2 | 4/2012 | Kupratis |
| 8,336,289 B2 | 12/2012 | Roberge |
| 8,393,857 B2 | 3/2013 | Copeland et al. |
| 8,468,795 B2 | 6/2013 | Suciu et al. |
| 8,529,188 B2 | 9/2013 | Winter |
| 8,578,700 B2 | 11/2013 | Khakhar |
| 8,657,561 B2 | 2/2014 | Buffone et al. |
| 8,770,921 B2 | 7/2014 | Huber et al. |
| 8,813,907 B2 | 8/2014 | Tanaka et al. |
| 8,862,362 B2 | 10/2014 | Teicholz et al. |
| 8,915,703 B2 | 12/2014 | Mohammed |
| 9,003,768 B2 | 4/2015 | Suciu et al. |
| 9,016,041 B2 | 4/2015 | Baughman et al. |
| 9,017,038 B2 | 4/2015 | Pelley et al. |
| 2008/0131268 A1 | 6/2008 | Guemmer |
| 2010/0166543 A1 | 7/2010 | Carroll |
| 2010/0281874 A1* | 11/2010 | Rice ............... F02K 3/025 60/770 |
| 2011/0146289 A1 | 6/2011 | Baughman |
| 2011/0167791 A1 | 7/2011 | Johnson et al. |
| 2011/0167792 A1 | 7/2011 | Johnson et al. |
| 2011/0167831 A1 | 7/2011 | Johnson |
| 2011/0176913 A1 | 7/2011 | Wassynger et al. |
| 2011/0252808 A1 | 10/2011 | McKenney et al. |
| 2013/0146675 A1* | 6/2013 | Seifert ............... F02K 1/008 239/1 |
| 2013/0323013 A1 | 12/2013 | Mercier et al. |
| 2014/0090388 A1 | 4/2014 | Hasel |
| 2014/0260180 A1 | 9/2014 | Kupratis et al. |
| 2014/0345253 A1 | 11/2014 | Dawson et al. |
| 2015/0102156 A1 | 4/2015 | Devenyi |
| 2015/0121838 A1 | 5/2015 | Suciu et al. |

* cited by examiner

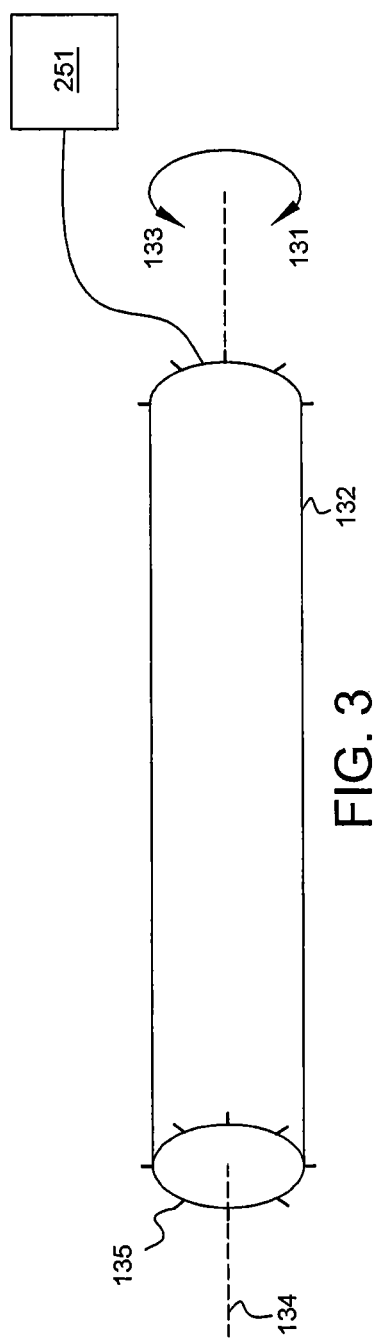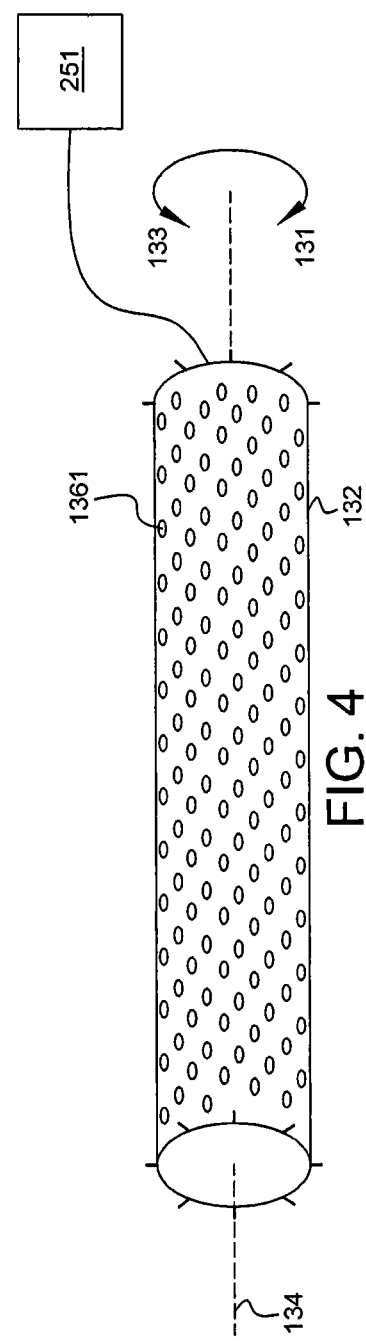

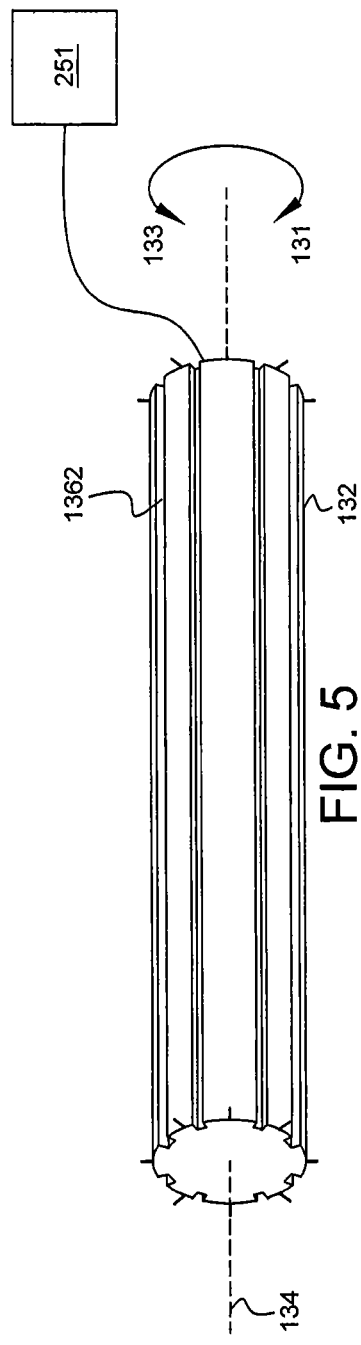
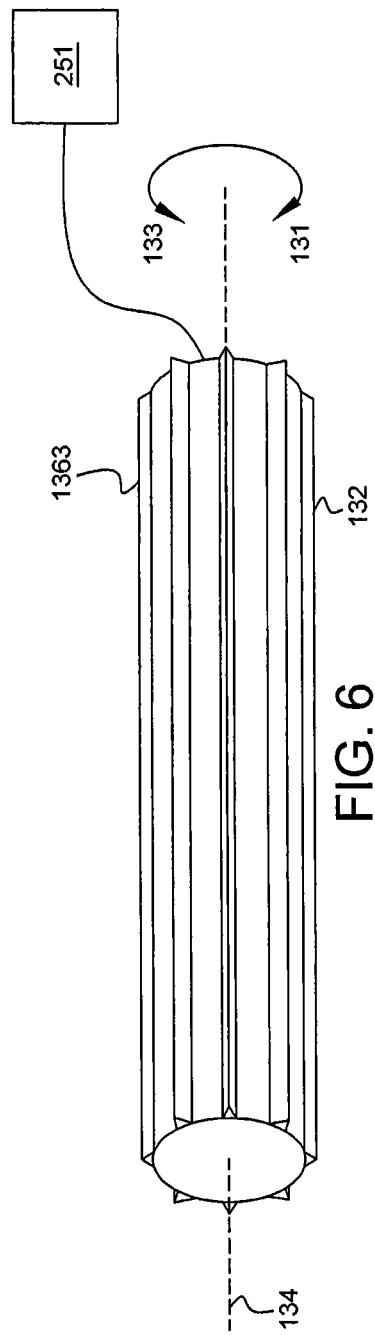

PROPULSIVE FORCE VECTORING

FIELD OF THE DISCLOSURE

This application is related to concurrently filed and co-pending applications U.S. patent application Ser. No. 14/837,190 filed 27 Aug. 2015 entitled "Splayed Inlet Guide Vanes"; U.S. patent application Ser. No. 14/837,302 filed 27 Aug. 2015 entitled "Morphing Vane"; U.S. patent application Ser. No. 14/837,942 filed 27 Aug. 2015 entitled "A System and Method for a Fluidic Barrier on the Low Pressure Side of a Fan Blade"; U.S. patent application Ser. No. 14/837,079 filed 27Aug. 2015 entitled "Integrated Aircraft Propulsion System"; U.S. patent application Ser. No. 14/837,987 filed 27 Aug. 2015 entitled "A System and Method for a Fluidic Barrier from the Upstream Splitter"; U.S. patent application Ser. No. 14/837,031 filed 27 Aug. 2015 entitled "Gas Turbine Engine Having Radially-Split Inlet Guide Vanes"; U.S. patent application Ser. No. 14/837,027 filed 27 Aug. 2015 entitled "A System and Method for a Fluidic Barrier with Vortices from the Upstream Splitter"; U.S. patent application Ser. No. 14/838,067 filed 27 Aug. 2015 entitled "A System and Method for Creating a Fluidic Barrier from the Leading Edge of a Fan Blade." The entirety of these applications are incorporated herein by reference.

FIELD OF THE DISCLOSURE

The present disclosure relates generally to manipulating propulsive forces, and more specifically to vectoring propulsive force using rotatable members in the path of an ejected fluid.

BACKGROUND

Objects, for example vessels, frequently have a need for changing the direction of a propulsive force imparted to them. Existing mechanisms for redirecting propulsive force can be cumbersome, slow, involve many moving parts, are inefficient and/or not cost effective.

SUMMARY

In various aspects and embodiments, disclosed are systems, apparatus and methods for vectoring a propulsive force imparted to an object. A fluid acceleration unit is adapted to eject a fluid to thereby provide a first component of the propulsive force. One or more arrays of rotatable members are disposed in the path of the ejected fluid. The rotatable members are fully rotatable about respective rotation axes extending through the respective members. The flow of the ejected fluid around the rotatable members when spinning provides a second component of propulsive force. Motors are adapted to spin rotatable members in one or more arrays in a first rotational direction to vector propulsive force in a first direction and further adapted to spin rotatable members in the one or more arrays in a second rotational direction to vector the propulsive force in a second direction.

BRIEF DESCRIPTION OF THE DRAWINGS

The following will be apparent from elements of the figures, which are provided for illustrative purposes and are not necessarily to scale.

FIG. 3 is a side view of a rotatable member according to some embodiments of the disclosure.

FIG. 4 is a side view of a rotatable member having dimples according to some embodiments of the disclosure.

FIG. 5 is a side view of a rotatable member having grooves according to some embodiments of the disclosure.

FIG. 6 is a side view of a rotatable member having ridges according to some embodiments of the disclosure.

Figure 1:
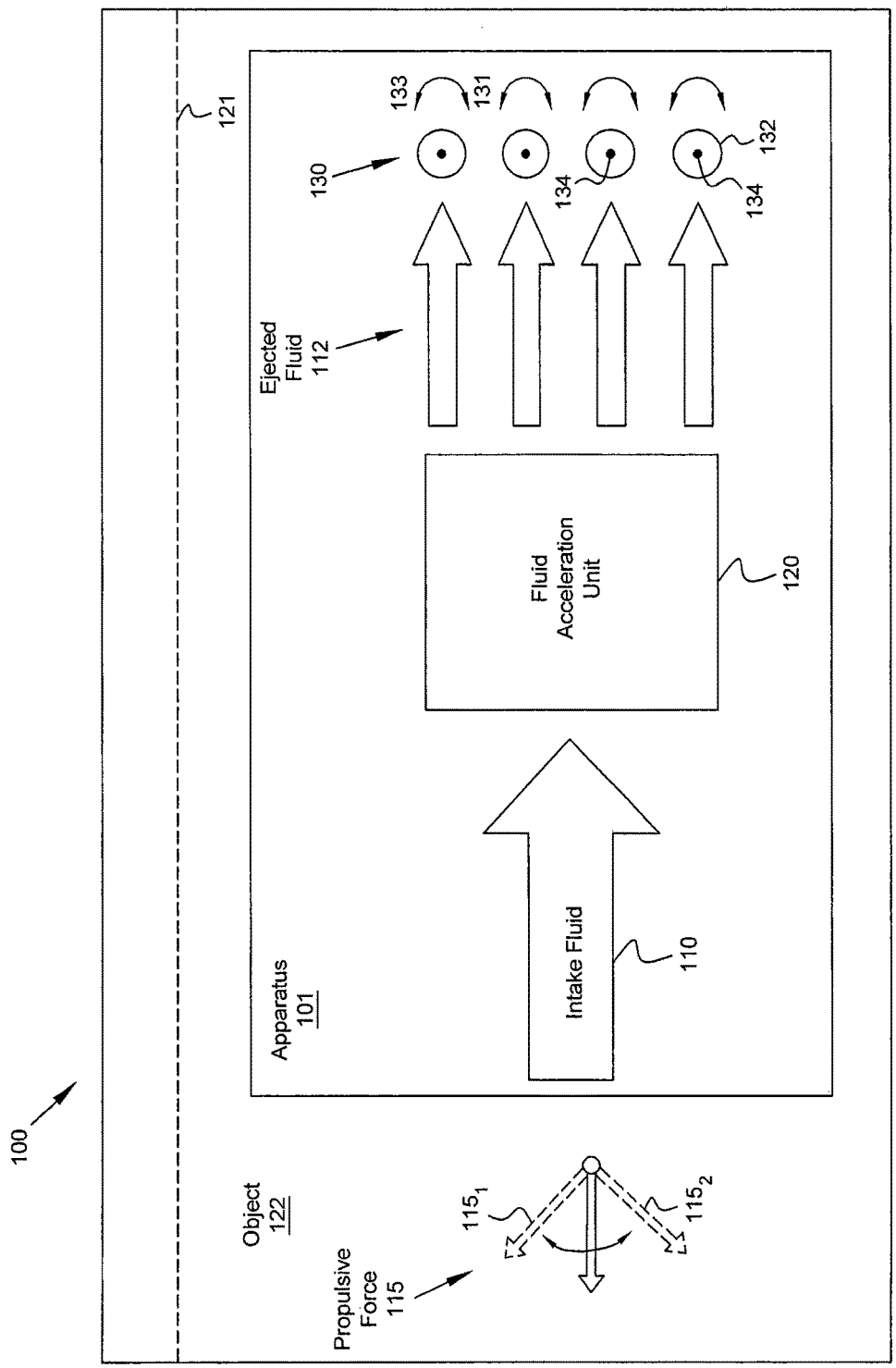
FIG. 1 is a schematic diagram of a system according to some embodiments of the disclosure.

While the present disclosure is susceptible to various modifications and alternative forms, specific embodiments have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the disclosure as defined by the appended claims.

DETAILED DESCRIPTION

For the purposes of promoting an understanding of the principles of the disclosure, reference will now be made to a number of illustrative embodiments shown in the drawings and described using specific language. Like reference numerals refer to like components.

This disclosure presents multiple embodiments to overcome or ameliorate one or more of the aforementioned deficiencies. More specifically, this disclosure is directed to using rotatable members to vector propulsive force.

FIG. 1 is a schematic diagram illustrating a system 100 according to some embodiments of the disclosure. System 100 includes an apparatus 101 adapted to impart propulsive force 115 to object 122. Apparatus 101 includes fluid acceleration unit 120 attached to object 122. Fluid acceleration unit 120 is configured to intake fluid 110 and eject it as ejected fluid 112, thereby imparting a first component of propulsive force 115 to object 122 in a direction opposite to the direction of flow of ejected fluid 112. In some embodiments, fluid 110 may be, for example, a gas such as air. In some embodiments, fluid 110 may be a liquid, such as water. Depending on the application, fluid acceleration unit 120 can be, for example, a fan, propeller, impeller, jet or the like. Fluid acceleration unit 120 can be forcibly rotated by an electric motor, combustion engine, a gas turbine engine, or the like. Object 122 may be a vessel, and in some embodiments is preferably an aircraft. In other embodiments object 122 may be, for example, a hovercraft, boat, ship, submarine or other watercraft. Object 122 may be manned or unmanned, i.e., a drone.

An array 130 of rotatable members 132 is disposed in the path of ejected fluid 112. Each rotatable member 132 is fully rotatable in two directions (clockwise 131 and counterclockwise 133) about a respective rotation axis 134 extending through the respective member 132. The rotation axis 134 of each rotatable member 132 can be disposed parallel to, and laterally spaced from, the rotation axes 134 of the other rotatable members 132 of array 130. In operation, the flow of ejected fluid 112 around rotatable members 132 when spinning provides a second component to propulsive force 115 according to the principles of the Kutta-Joukowski lift phenomenon.

Apparatus 101 has one or more motors (not shown) to spin a selectable number of rotatable members 132 in array 130 in a clockwise direction 131 to vector propulsive force 115 to a first direction 115$_1$. The motors can also spin the same or any combination of selectable rotatable members 132 in array 130 in a counterclockwise direction 133 to vector propulsive force 115 to a second direction 115$_2$. The motors can spin the rotatable members 132 in a mixed combination of directions and rates to achieve the desired vectoring of propulsive force 115. While object 122 is in motion or flight based, at least in part, on propulsive force 115, apparatus 101 is adapted to change the vector of propulsive force 115 by changing the direction of rotation of one or more of rotatable members 132, and optionally also the rate of such rotation.

In some embodiments, the motors are adapted to spoil propulsive force 115 by spinning a first set of rotatable members 132 in clockwise direction 131 while spinning a second set of rotatable members 132 in counterclockwise direction 133. Spoiling propulsive force 115 in this way advantageously allows fluid acceleration unit 120 to operate at a higher power level than would otherwise be possible during periods where object 122 is in a slow or stationary mode. One benefit is that object 122 can rapidly transition to a high speed mode of travel by changing the rotation of rotatable members 132.

In some embodiments the motors are electric. One or more motors can be embedded within a rotatable member 132 of array 130. For example, a given rotatable member 132 can have dual motors, one embedded in each end for redundancy.

Object 122 can have a reference line 121. In some embodiments, reference line 121 is a horizontal reference line such as a waterline that is fixed relative to object 122. As shown in FIG. 1, ejected fluid 112 approaches array 130 at an approach angle that is parallel to reference line 121. In other embodiments, ejected fluid 112 approaches array 130 at an approach angle that is downward relative to reference line 121. For example, the approach angle can be fixed between 40 and 50 degrees down from reference line 121. In some embodiments, the approach angle can be fixed at 45 degrees down from reference line 121. In alternative embodiments, apparatus 101 is mechanized relative to object 122 to controllably change the approach angle of ejected fluid 112 relative to reference line 121, for example to change the approach angle of ejected fluid 112 while object 122 is in motion or flight.

Providing ejected fluid 112 to array 130 at a down angle is particularly advantageous for embodiments where object 122 can benefit from vertical lift and horizontal thrust, relative to the ground. Note that horizontal reference line 121 is fixed in object 122, and thus will diverge from horizontal as the orientation of object 122 changes relative to the ground. For example, with a downward approach angle and horizontal reference line 121 close to horizontal relative to ground, propulsive force 115 provides lift to object 122 when rotatable members 132 are spun in clockwise direction 131, and provides horizontal thrust to object 122 when spun in counterclockwise direction 133. Such a configuration allows for object 122 to hover, takeoff, land, etc. vertically in a first mode of operation and to travel horizontally in a second mode of operation.

In some embodiments, array 130 extends across the flow path of ejected fluid 112, such that substantially all of ejected fluid 112 interacts with at least one rotatable member 132 of array 130.

Figure 2:
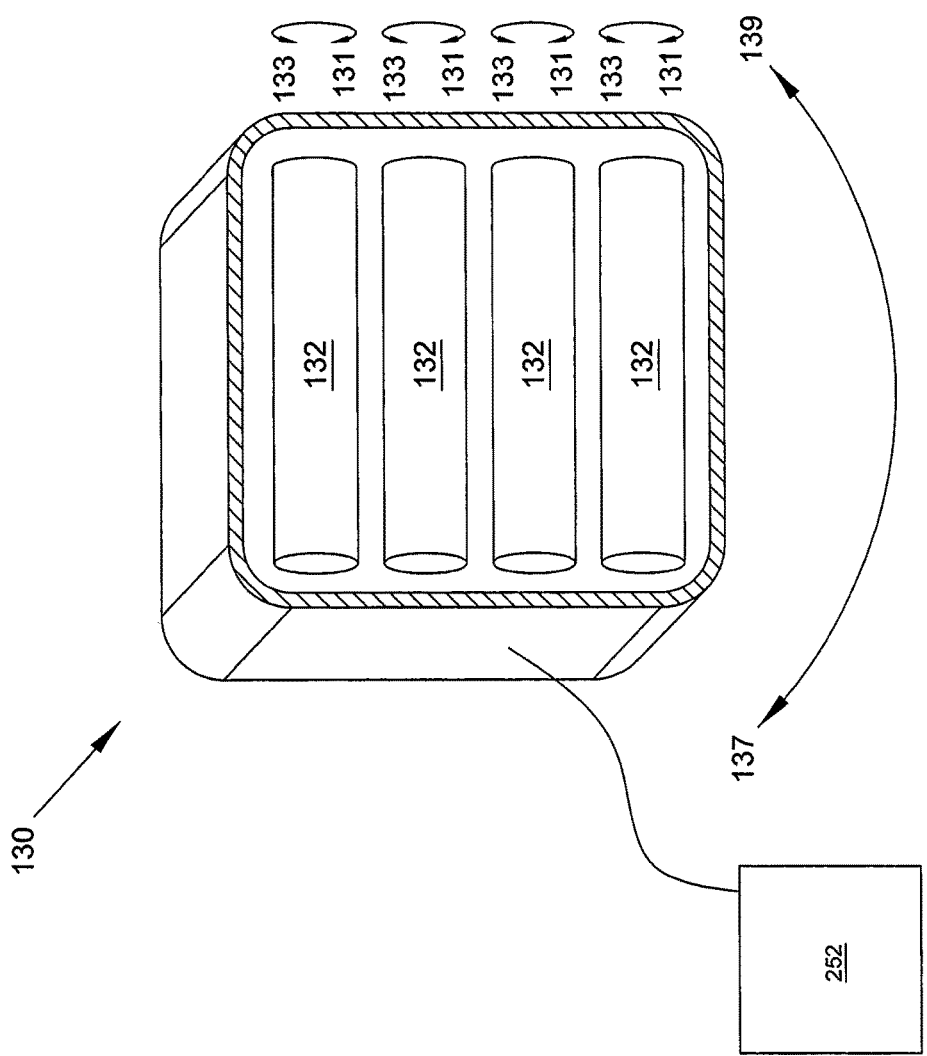
FIG. 2 is a cross-sectional rear elevation view of a first array of rotatable members according to some embodiments of the disclosure.

FIG. 2 is a cross-sectional rear elevation view of array 130. Array 130 comprises a plurality of rotatable members 132 which as shown are distributed substantially equally across the exit area. In the view shown, rotatable members 132 pin array 130 are disposed relative to the plane of the page. An array rotator 252 repositions array 130 by rotating it in a clockwise direction 137 or counterclockwise direction 139 about an axis normal to the plane of the page. The array rotator 252 as taught herein can be implemented, for example, using a motor and appropriate linkage. The array rotator 252 provides an additional axis of control in vectoring propulsive force 115. Further, similar array rotators can be used with embodiments having further arrays downstream of array 130.

FIGS. 3-6 are side views of a rotatable member 132. In some embodiments, rotatable member 132 is cylindrical about axis 134 as shown in FIG. 3. In other embodiments (not shown), at least portions of rotatable members 132 can take other forms, such as being bulbous, spherical, polygonal, or other shapes that provide Kutta-Joukowski lift when spun in a flow. In some embodiments, prongs 135 on the rotatable members 132 are adapted to engage one or more motors 251 for forcibly spinning rotatable members 132. In some embodiments, the surface of a rotatable member 132 is adapted with disruptions to enhance the vectoring effect imparted by spinning the rotatable member 132 in a flow. The disruptions allow flow to better adhere to the surface of the rotatable member 132, aiding the Kutta-Joukowski lift phenomena. The disruptions may include a plurality of dimples 1361, as shown in FIG. 4. In alternative embodiments, the disruptions may include grooves 1362, as shown in FIG. 5, or ridges 1363, as shown in FIG. 6.

Figure 7:
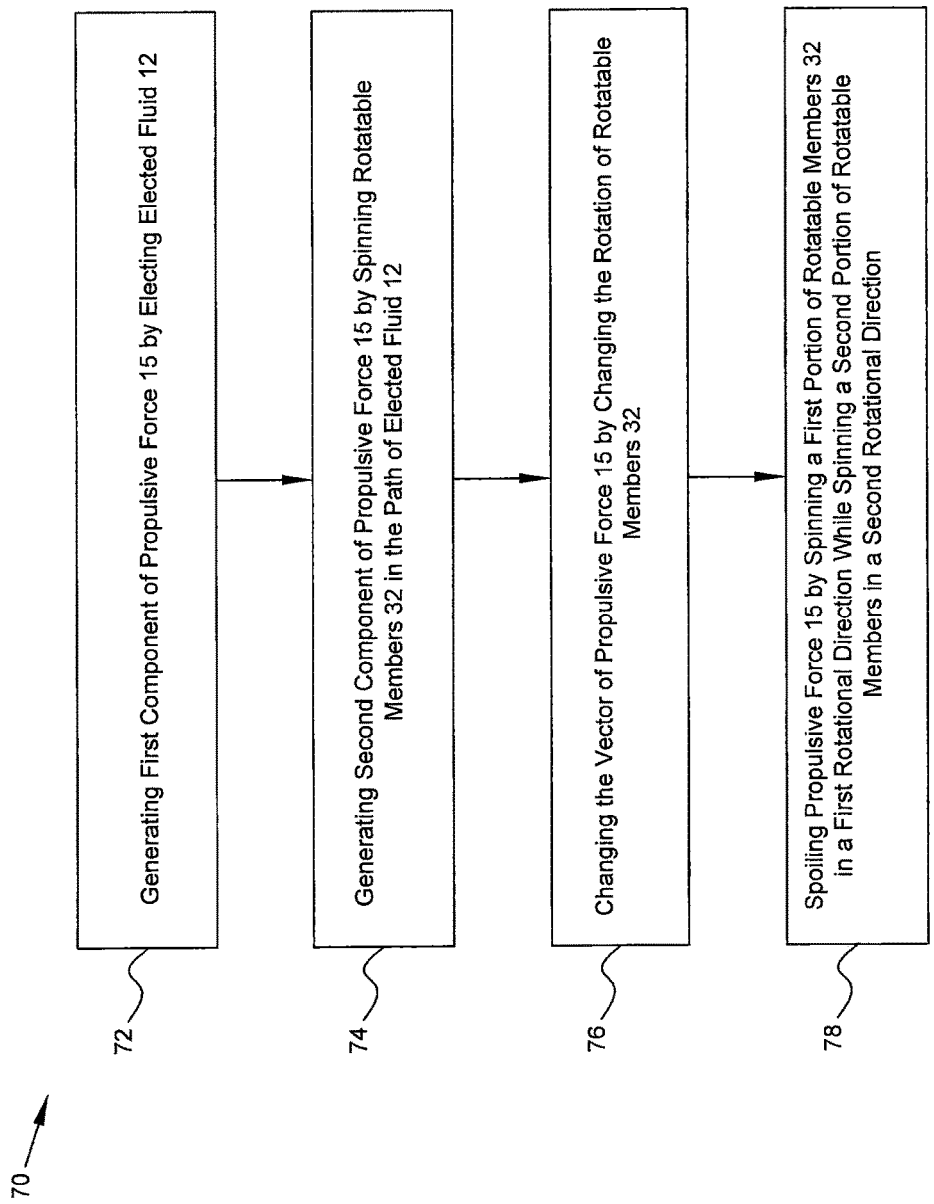
FIG. 7 is a flow diagram showing steps for vectoring thrust according to some embodiments of the disclosure.

FIG. 7 is a flow diagram for process 70 including steps for vectoring propulsive force 115 according to some embodiments of the disclosure. In block 72, a first component of propulsive force 115 is generated by ejecting the ejected fluid 112. In block 74, a second component of propulsive force 115 is generated by spinning rotatable members 132 in the path of ejected fluid 112. In block 76, the vector of propulsive force 115 is changed by changing the rotation of one or more of rotatable members 132. In some embodiments, object 122 is capable of flight based in part on propulsive force 115 and the step of changing the vector in block 76 includes changing the direction of rotation of one or more rotatable members 132 while object 122 is in flight. In some embodiments, propulsive force 115 is spoiled in block 78 by spinning a first set of rotatable members 132 in a first rotational direction while spinning a second set of rotatable members 132 in a second rotational direction.

Figure 8:
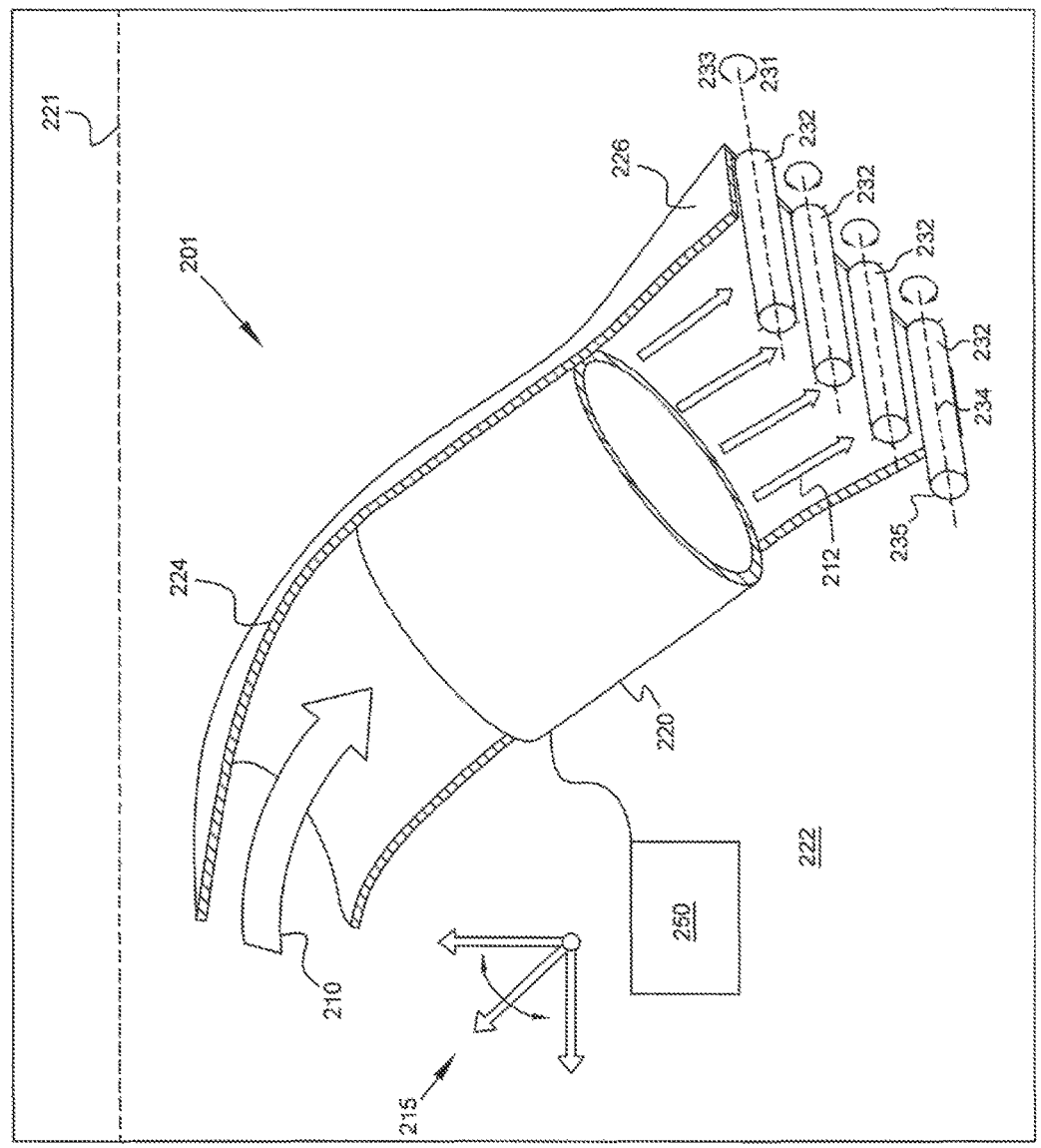
FIG. 8 is a perspective, cross-sectional view of an apparatus for vectoring thrust according to some embodiments of the disclosure.

FIG. 8 is a perspective, cross-sectional view of apparatus 201 for vectoring thrust to an aircraft 222 in a system 200 according to some embodiments of the disclosure. Except where context dictates otherwise, the description in connection with apparatus 101 and system 100 above applies to the aircraft embodiments of system 200. System 200 comprises aircraft 222 having an apparatus 201 with an inlet plenum 224, fan module 220, and an array 230 of rotatable cylinders 232.

Aircraft 222 is preferably configured with distributed propulsion such that one or more gas turbine cores or electric motors 250 which distribute power to apparatus 201 and any number of additional units exemplified by apparatus 201. Air 210 is drawn into fan module 220 via an inlet plenum 224. Fan module 220 forcibly accelerates air 210 and ejects it as ejected air 212 toward an array 230 of rotatable cylinders 232. Ejected air 212 is directed onto rotatable cylinders 232 via fan nozzle 226. Rotatable cylinders 232 are mounted at or near the exit of fan nozzle 226 and as shown are distributed substantially equally across the exit of the fan nozzle 226. In some embodiments, at least inlet plenum 224 and fan module 220 are fixed relative to the airframe of aircraft 222 such that ejected air 212 approaches array 230 at or near a 45 degree angle down from a horizontal reference line 221 of aircraft 222. In some embodiments the approach angle is fixed between 40 and 50 degrees down from the horizontal reference line 221.

Figure 9:
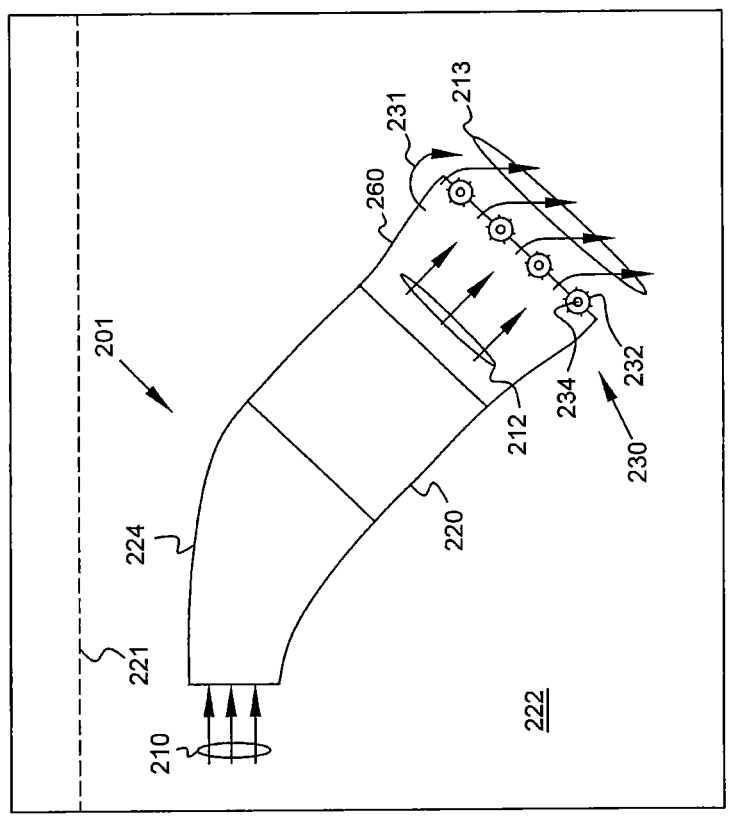
FIG. 9 is a side, schematic view of the apparatus of FIG. 8 in a first mode of operation.

FIG. 9 is a side, schematic view of apparatus 201 in a first mode of operation where rotatable cylinders 232 are shown spinning in clockwise direction 231. The spinning redirects ejected air 212 as downward air 213, providing vertical lift to aircraft 222, at least when aircraft 222 is oriented with horizontal reference line 221 in a horizontal position relative to the ground.

Figure 10:
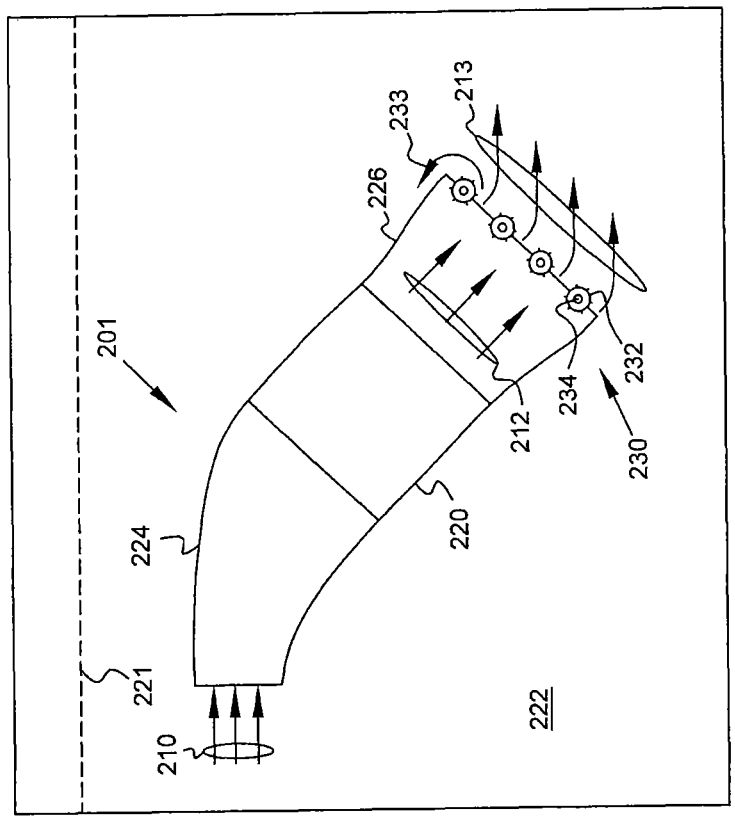
FIG. 10 is a side, schematic view of the apparatus of FIG. 8 in a second mode of operation.

FIG. 10 is a side, schematic view of apparatus 201 in a second mode of operation where rotatable cylinders 232 are shown spinning in counterclockwise direction 233. The spinning redirects ejected air 212 as horizontal air 217, providing horizontal thrust to aircraft 222, at least when aircraft 222 is oriented with horizontal reference line 221 in a horizontal position relative to the ground.

Figure 11:
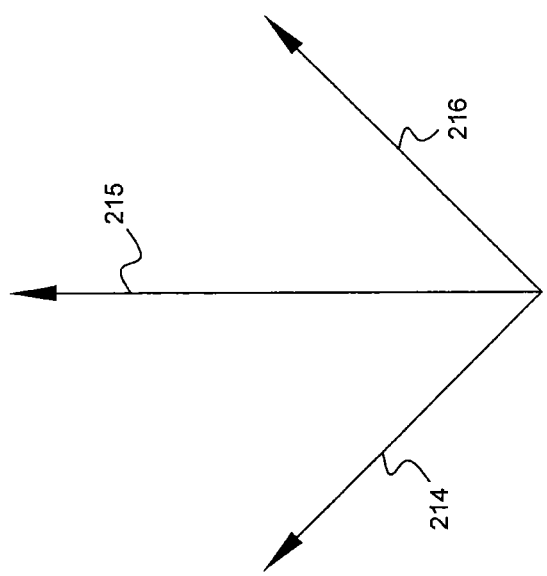
FIG. 11 is a vector diagram showing components of the propulsive force according to the mode of operation shown in FIG. 9.

FIG. 11 is a vector diagram showing components of propulsive force 215 imparted to aircraft 222 according to the mode of operation shown in FIG. 9. Acceleration of air 210 by fan module 220 provides a first component 214 of propulsive force 215. The flow of ejected air 212 across rotatable cylinders 232 while they are spinning in clockwise direction 231 creates a second component 216 of propulsive force 215. As illustrated, the combination of the components provide vertical lift.

Figure 12:
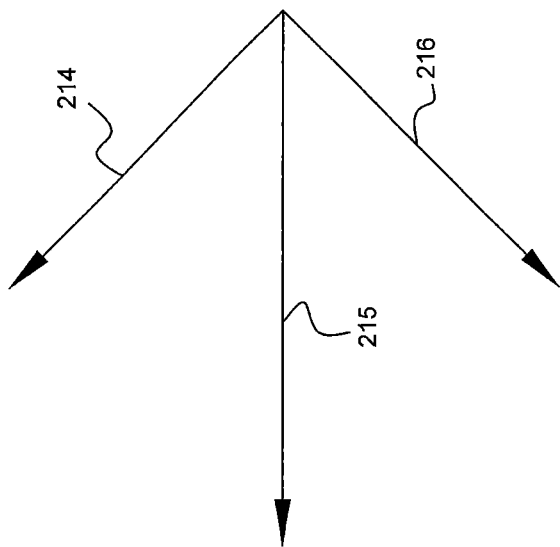
FIG. 12 is a vector diagram showing components of the propulsive force according to the mode of operation shown in FIG. 10.

FIG. 12 is a vector diagram showing components of propulsive force 215 imparted to aircraft 222 according to the mode of operation shown in FIG. 10. Like the mode of operation discussed for FIG. 9, acceleration of air 210 by fan module 220 provides first component 214 of propulsive force 215. However, the flow of ejected air 212 across rotatable cylinders 232 while they are spinning in counterclockwise direction 233 creates second component 216 of propulsive force 215 in the direction illustrated. As shown, the combination of the components provide horizontal thrust.

Figure 13:
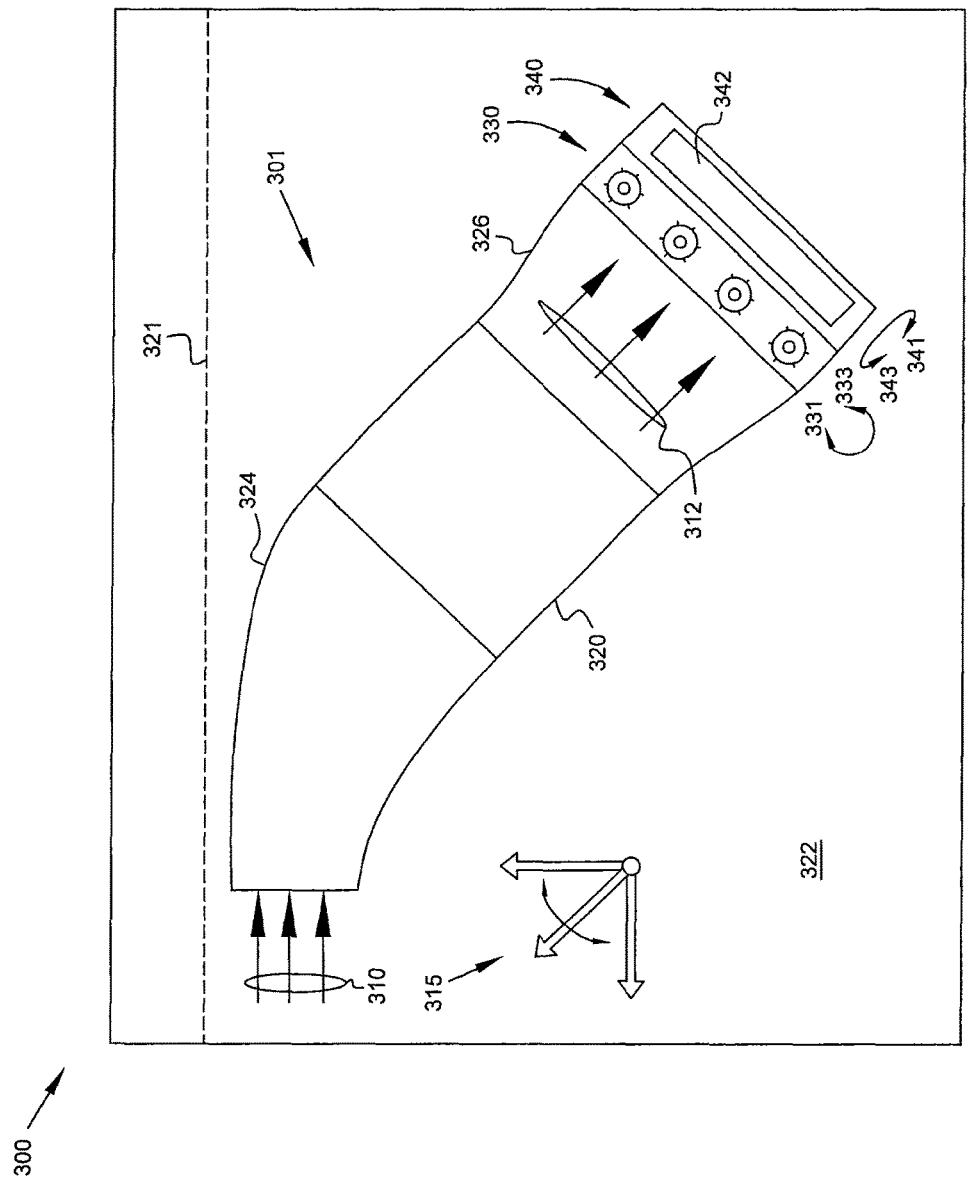
FIG. 13 is a side, schematic view of an apparatus for vectoring thrust according to some embodiments of the disclosure.
Figure 14:
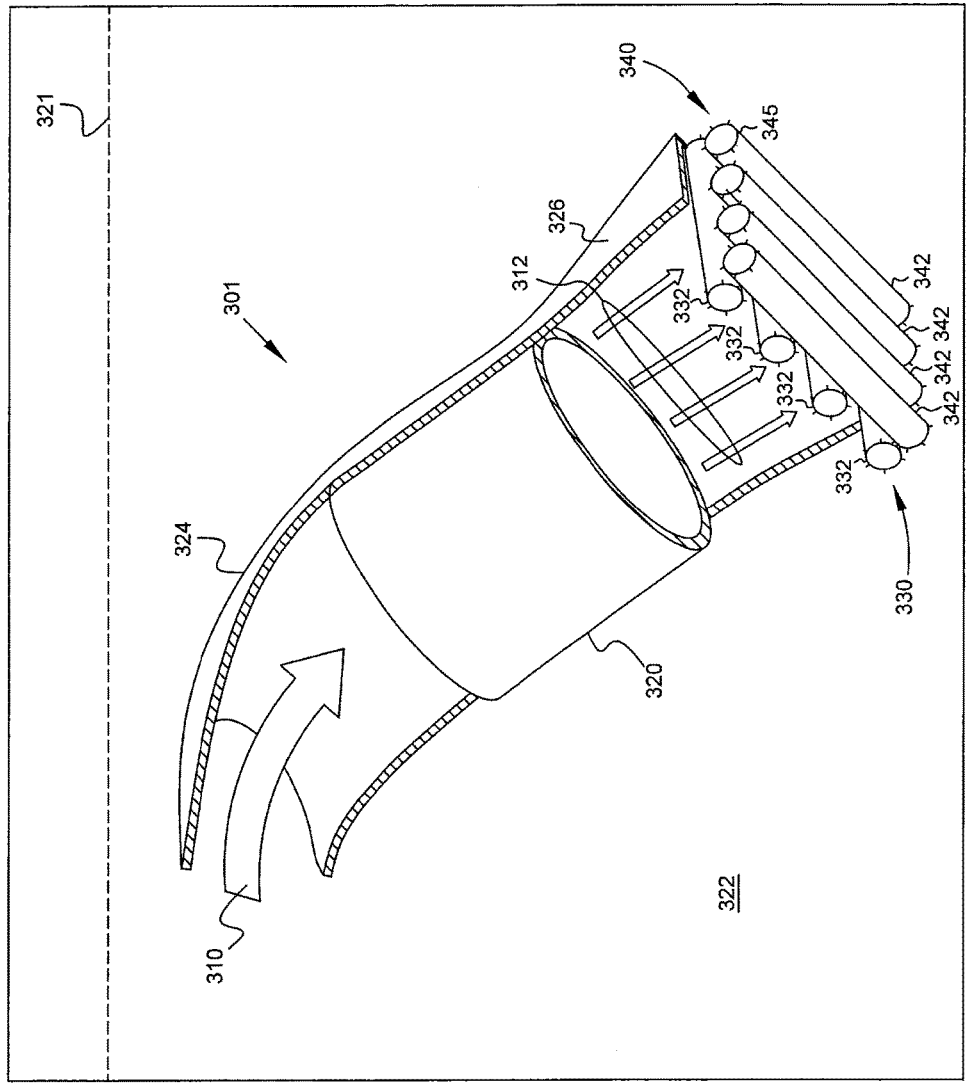
FIG. 14 is a perspective, cross-sectional view of the apparatus of FIG. 13.

FIG. 13 is a side, schematic view of apparatus 301 for vectoring thrust in system 300 according to some embodiments of the disclosure. FIG. 14 is perspective, cross-sectional view of apparatus 301. Apparatus 301 and system 300 has the characteristics and operation as described for apparatus 101, 201 and systems 100, 200, but has a second array 340 of rotatable cylinders, array 340 disposed downstream of array 330. Array 340 has a plurality of rotatable cylinders 342 that have the characteristics and operation as described for rotatable cylinders 132 and 232. The rotatable cylinders 332 of array 330 may be spun simultaneously with, or alternatively to, rotatable cylinders 342 of array 340. The presence of a second array provides additional vectoring capability, and introduces a third component to propulsive force 315. In some embodiments, the rotatable cylinders 332 may be disposed orthogonally to the rotatable cylinders 342, as shown in FIGS. 13 and 14. In some embodiments array 340 has a further array rotator (not shown), as described for array 130 in connection with FIG. 2. In other embodiments, array 330 and 340 can be rotated together by the same array rotator. The additional rotatable cylinders 342 provided by array 340 can also be used in selectively spoiling propulsive force 315, as discussed with respect to system 100.

Although examples are illustrated and described herein, embodiments are nevertheless not limited to the details shown, since various modifications and structural changes may be made therein by those of ordinary skill within the scope and range of equivalents of the claims.

What is claimed is:

1. An apparatus for vectoring a propulsive force imparted to an object, the apparatus comprising:
   a fluid acceleration unit adapted to eject a fluid from a nozzle to thereby provide a first component of said propulsive force, the nozzle defining an exit area substantially perpendicular to a path of the ejected fluid;
   a first array of rotatable members disposed in the path of said ejected fluid, each of said rotatable members being fully rotatable about a respective rotation axis extending through the respective member, wherein a flow of said ejected fluid around said rotatable members when spinning provides a second component of said propulsive force, the rotatable members of the first array positioned downstream of the nozzle and distributed substantially equally across the exit area; and
   one or more motors adapted to spin one or more of said rotatable members in said first array in a first rotational direction to vector said propulsive force in a first direction and further adapted to spin one or more of said rotatable members in said first array in a second rotational direction to vector said propulsive force in a second direction, wherein all the propulsive force is provided by manipulation of the fluid;
   further comprising a second array of rotatable members disposed in the path of said ejected fluid and downstream of said first array, wherein the flow of said ejected fluid over the rotatable members of said second array when said members of the second array are spinning provides a third directional component to said propulsive force.

2. The apparatus of claim 1, wherein said rotatable members in said second array and said rotatable members in said first array are configured to spin simultaneously to vector said propulsive force.

3. The apparatus of claim 1, wherein said rotatable members in said second array are disposed relative to a second plane and wherein said apparatus further comprises a second array rotator that rotates said second array about a second axis normal to said second plane to provide an additional control in vectoring said propulsive force.

4. A system for vectoring a propulsive force, the system comprising:
   an object adapted to be acted upon by said propulsive force;
   a plurality of apparatus mounted to said object, each apparatus comprising:

a fluid acceleration unit adapted to forcibly eject a fluid to thereby provide a first respective component of said propulsive force;

a first array of rotatable members disposed in a path of said ejected fluid, each of said rotatable members being fully rotatable about a respective rotation axis extending through the respective member, wherein a flow of said ejected fluid around said rotatable members when spinning provides a second respective component of said propulsive force;

a second array of rotatable members disposed in the path of said ejected fluid and downstream of said first array, wherein the flow of said ejected fluid over the rotatable members of said second array when said members of the second array are spinning provides a third directional component to said propulsive force;

the rotatable members of the first array and second array positioned downstream of the nozzle and distributed substantially equally across the flow; and one or more motors adapted to spin one or more of said rotatable members in said first array in a first rotational direction to vector said propulsive force in a first direction and further adapted to spin one or more of said rotatable members in said first array in a second rotational direction to vector said propulsive force in a second direction;

the one or more motors adapted to spin one or more of said rotatable members in said second array in a third rotational direction to vector said propulsive force in a third direction and further adapted to spin one or more of said rotatable members in said second array in a fourth rotational direction to vector said propulsive force in a fourth direction;

wherein all the propulsive force on the object is generated via manipulation of the fluid.

5. The apparatus of claim 1, wherein the second array comprises three or more rotatable members.

* * * * *